Dec. 17, 1957 R. E. FRIEDRICH 2,816,991

CIRCUIT INTERRUPTERS

Filed Dec. 30, 1953 13 Sheets-Sheet 1

INVENTOR
Robert E. Friedrich
BY
Ralph H. Swingle
ATTORNEY

Dec. 17, 1957 R. E. FRIEDRICH 2,816,991

CIRCUIT INTERRUPTERS

Filed Dec. 30, 1953 13 Sheets-Sheet 2

Dec. 17, 1957 R. E. FRIEDRICH 2,816,991

CIRCUIT INTERRUPTERS

Filed Dec. 30, 1953 13 Sheets-Sheet 4

Dec. 17, 1957 R. E. FRIEDRICH 2,816,991

CIRCUIT INTERRUPTERS

Filed Dec. 30, 1953 13 Sheets-Sheet 6

Dec. 17, 1957 R. E. FRIEDRICH 2,816,991
CIRCUIT INTERRUPTERS
Filed Dec. 30, 1953 13 Sheets-Sheet 9
Fig. 30.
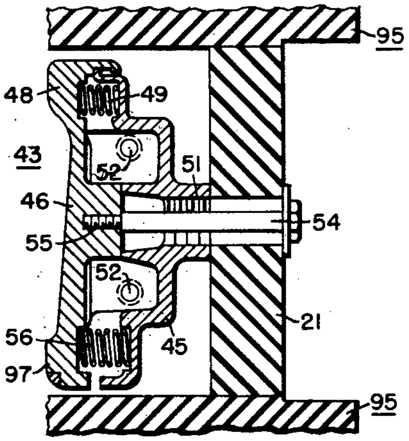
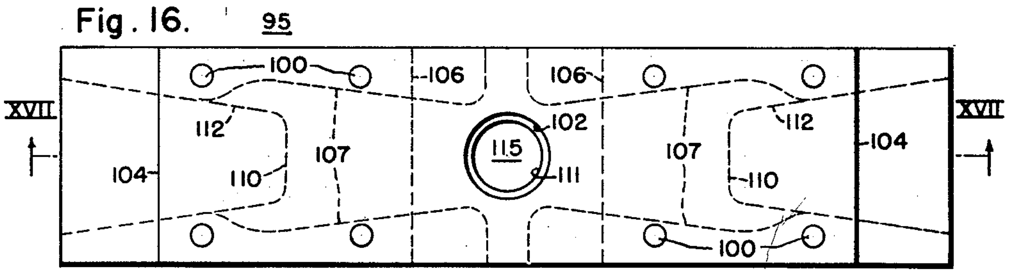
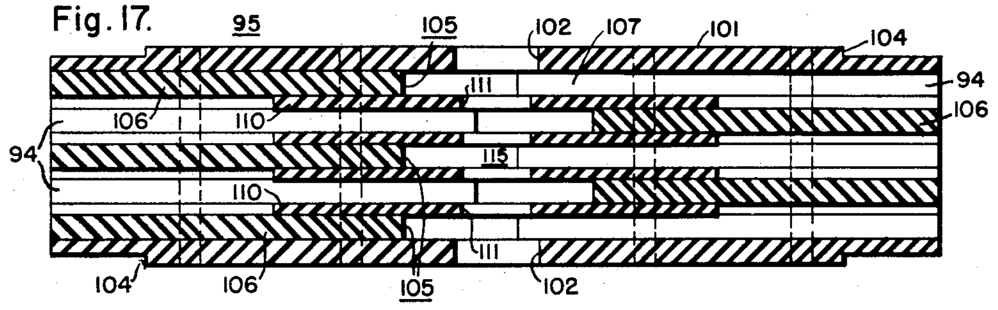
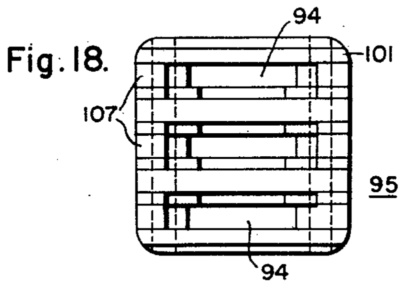

Dec. 17, 1957 R. E. FRIEDRICH 2,816,991

CIRCUIT INTERRUPTERS

Filed Dec. 30, 1953 13 Sheets-Sheet 10

Dec. 17, 1957 R. E. FRIEDRICH 2,816,991

CIRCUIT INTERRUPTERS

Filed Dec. 30, 1953 13 Sheets-Sheet 11

Dec. 17, 1957 R. E. FRIEDRICH 2,816,991

CIRCUIT INTERRUPTERS

Filed Dec. 30, 1953 13 Sheets-Sheet 12

United States Patent Office 2,816,991
Patented Dec. 17, 1957

2,816,991

CIRCUIT INTERRUPTERS

Robert E. Friedrich, Pittsburgh, Pa., assignor to Westinghouse Electric Corporation, East Pittsburgh, Pa., a corporation of Pennsylvania Application December 30, 1953, Serial No. 401,239

24 Claims. (Cl. 200—145)

This invention relates to circuit interrupters in general, and, more particularly, to arc-extinguishing devices and contact structures therefor.

A general object of my invention is to provide an improved circuit interrupter, particularly adapted for high-voltage application and for carrying heavy load currents with an extremely high interrupting capacity, but it will be evident to those skilled in the art that certain features of my invention may be applicable to circuit interrupters of lower capacity.

It is an object of the invention to provide a circuit breaker for utilization on transmission systems having voltages in excess of 230 kv. and having an interrupting capacity in excess of 15,000,000 kva., as have been used in the past. For example, the circuit interrupter of this invention has been devised for use on a 330 kv. system, may have a continuous current carrying capacity of 2,000 amperes and an unprecedented interrupting rating of 25,000,000 kva.

Not only is it desirable to provide an interrupter which may have a continuous current carrying capacity of 2,000 amperes at 330 kv., but also such a breaker preferably should fulfill other requirements, such as having a momentary current carrying capacity of 69,000 amperes, having an interrupting time of 3 cycles at all currents within the interrupter's rating, and finally having a high-speed reclosing time, say of the order of 15 cycles.

It is a further purpose of my invention to provide an improved circuit interrupter of radically different design, which will fulfill the foregoing requirements, and will provide, in addition, trouble-free operation with little necessity for servicing.

It is a further object of my invention to provide an improved circuit interrupter of the type establishing a plurality of serially-related breaks, and to provide such breaks in a manner which will be simple to assemble and which may be easily disassembled.

Still another object of my invention is to provide an improved movable contact assembly for a circuit interrupter, so that a rigid structure results which is adaptable for simultaneously establishing a plurality of serially-related breaks.

Yet a further object of my invention is to provide an improved relatively stationary bridging contact assemblage, which is of improved and simple design, and which may be readily assembled within the circuit breaker casing and may be readily removed therefrom.

Another object of my invention is to provide an improved interrupting structure which will more effectively utilize the fluid flow to more quickly bring about arc extinction.

A more specific object is to provide a cemented plate construction for an arc-extinguishing unit to provide a more rigid construction and to prevent fluid flow between the plates.

A further object of my invention is to provide an improved means for retracting a plurality of serially-related bridging contacts outwardly, so that the movable contact assemblage of my invention may be easily removed out of the interrupter for inspection and possible servicing.

Yet a further object of my invention is to provide a circuit interrupter, particularly one adapted for high-voltage interruption, which may readily be modified to provide one or more pressure-generating breaks with one or more interrupting breaks.

Still a further object of my invention is to provide an improved design for a circuit interrupter of repeatable unit construction which may be readily adapted for any voltage level.

Yet a further object of my invention is to provide an improved relatively stationary bridging contact construction for a circuit interrupter of the type utilizing a plurality of serially-related breaks.

Further objects and advantages will readily become apparent upon reading the following specification taken in conjunction with the drawings; in which, Figure 1 is a side elevational view, partially in vertical section, of a circuit interrupter embodying my invention with the contact structure being shown in the closed-circuit position;

Fig. 16 is a top plan view of one of the arc-extinguishing units, or laminated grid structures, utilized in the circuit interrupter embodying my invention;

Fig. 17 is a vertical sectional view taken along the line XVII—XVII of Fig. 16;

Fig. 18 is an end elevational view of the arc-extinguishing unit illustrated in Figs. 16 and 17;

Fig. 30 shows how one of the mounting bolts for one of the bridging contacts may be removed, and another bolt may be substituted therefor to effect a retraction of the bridging contact to enable the movable contact assemblage to be withdrawn from the circuit interrupter casing;

Figure 1:
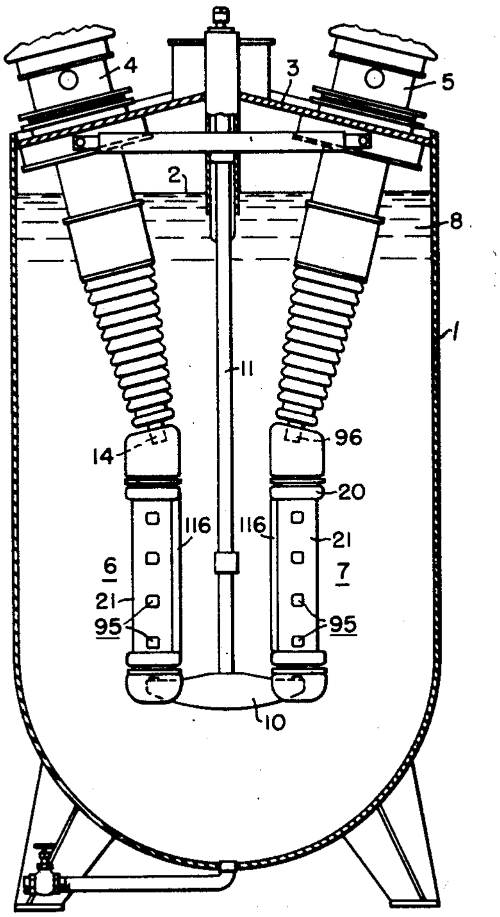

Referring to the drawings, and more particularly to Fig. 1 thereof, the reference numeral 1 designates a tank filled to the level 2 with a suitable arc-extinguishing fluid 8, in this instance circuit breaker oil. Supported by the cover 3 of the tank 1 are a pair of terminal bushings 4, 5, to the lower interior ends of which depend interrupting assemblies, generally designated by the reference numerals 6, 7.

Electrically interconnecting the interrupting assemblies 6, 7 is a conducting cross-bar 10, which is vertically actuated in a reciprocal manner by an insulating operating rod 11. The operating rod 11 may be actuated by any suitable mechanism, which forms no part of my invention.

Figure 2:
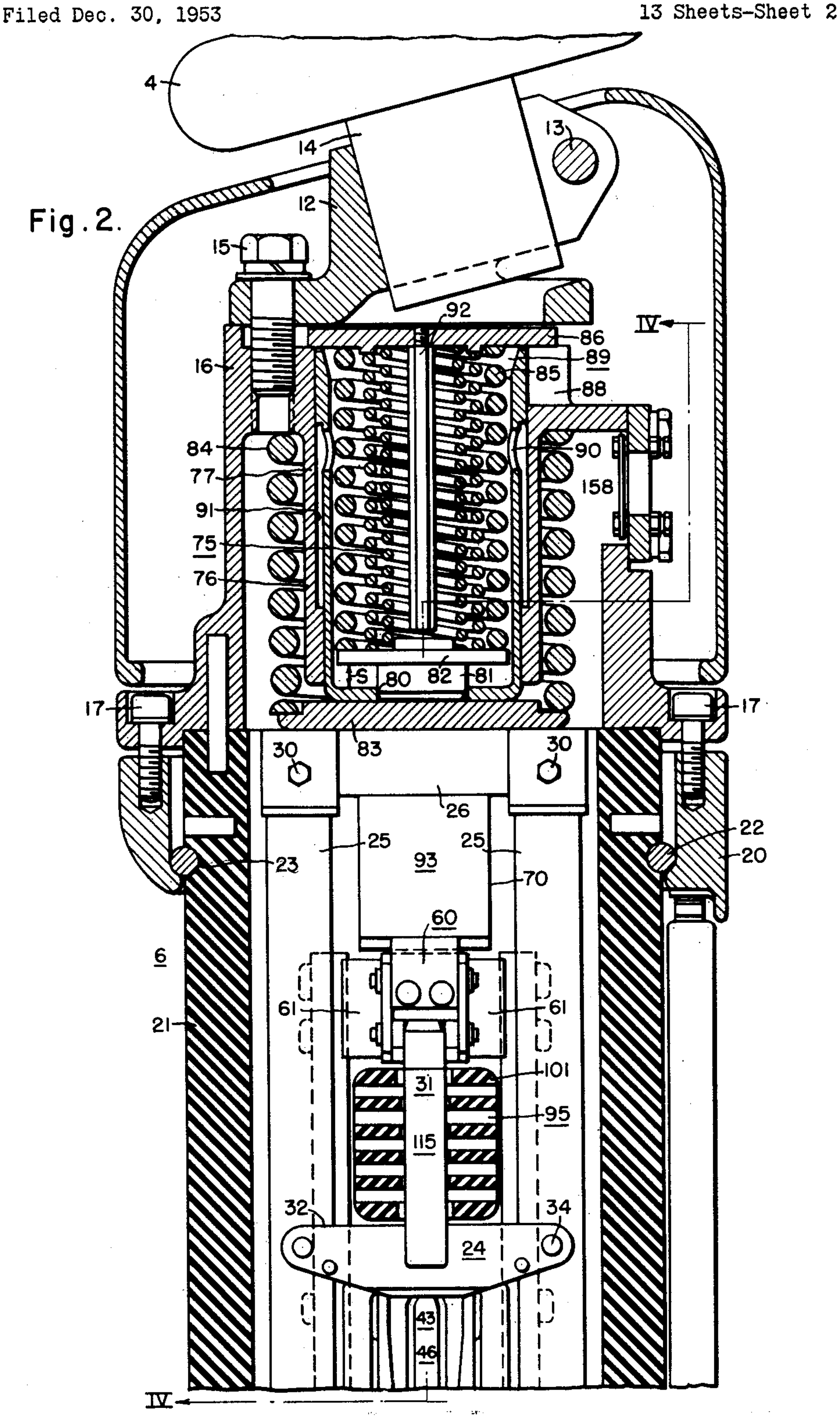
Fig. 2 is a vertical sectional view of a portion of the upper end of the left-hand interrupting assembly shown in Fig. 1, with the contact structure being illustrated in the closed-circuit position.
Figure 3:
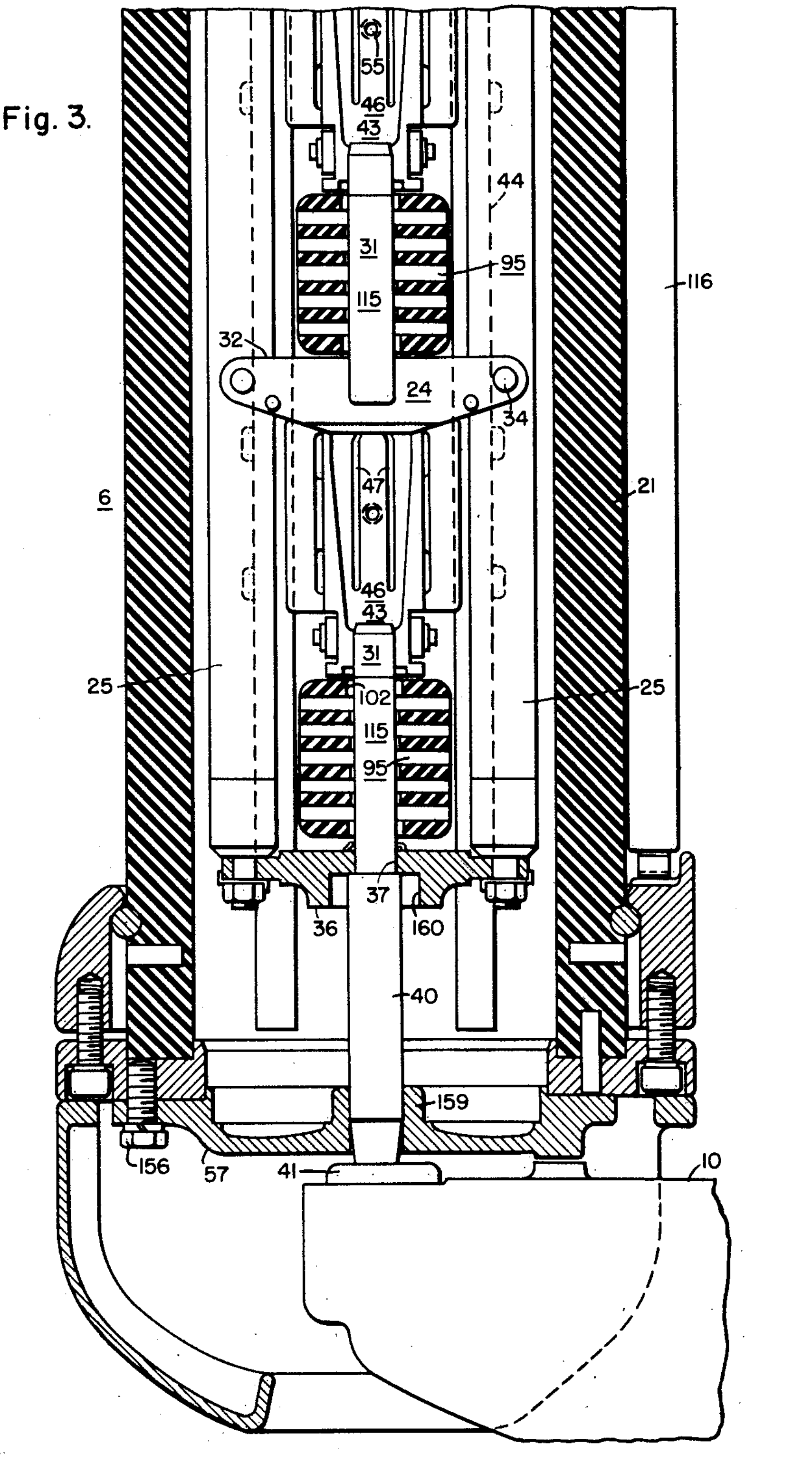
Fig. 3 is a view similar to that of Fig. 2, but showing a vertical sectional view through the lower end of the left-hand interrupting assembly illustrated in Fig. 1, the contact structure being likewise shown in the closed-circuit position.

Referring more particularly to Figs. 2 and 3, taken collectively, these figures, when considered together, illustrate an enlarged vertical sectional view taken through the interrupting assemblage 6 of Fig. 1, the contact structure being represented in the closed-circuit position. It will be noted that a contact foot 12 is secured and clamped by bolt 13 to the lower end 14 of the conductor stud passing interiorly through the left-hand terminal bushing 4 of Fig. 1.

The contact foot 12 is secured by three triangularly-disposed mounting bolts 15 to the top casting 16 of the assemblage 6. The casting 16, in turn, is secured by a plurality of bolts 17 to an annular clamping flange 20. The clamping flange 20 is rigidly secured to the upper end of a casing 21 by means of a clamping ring 22, which is inserted within an annular groove 23 provided adjacent the upper end of the casing 21, as shown in Fig. 2.

Figures 8, 9, 10:
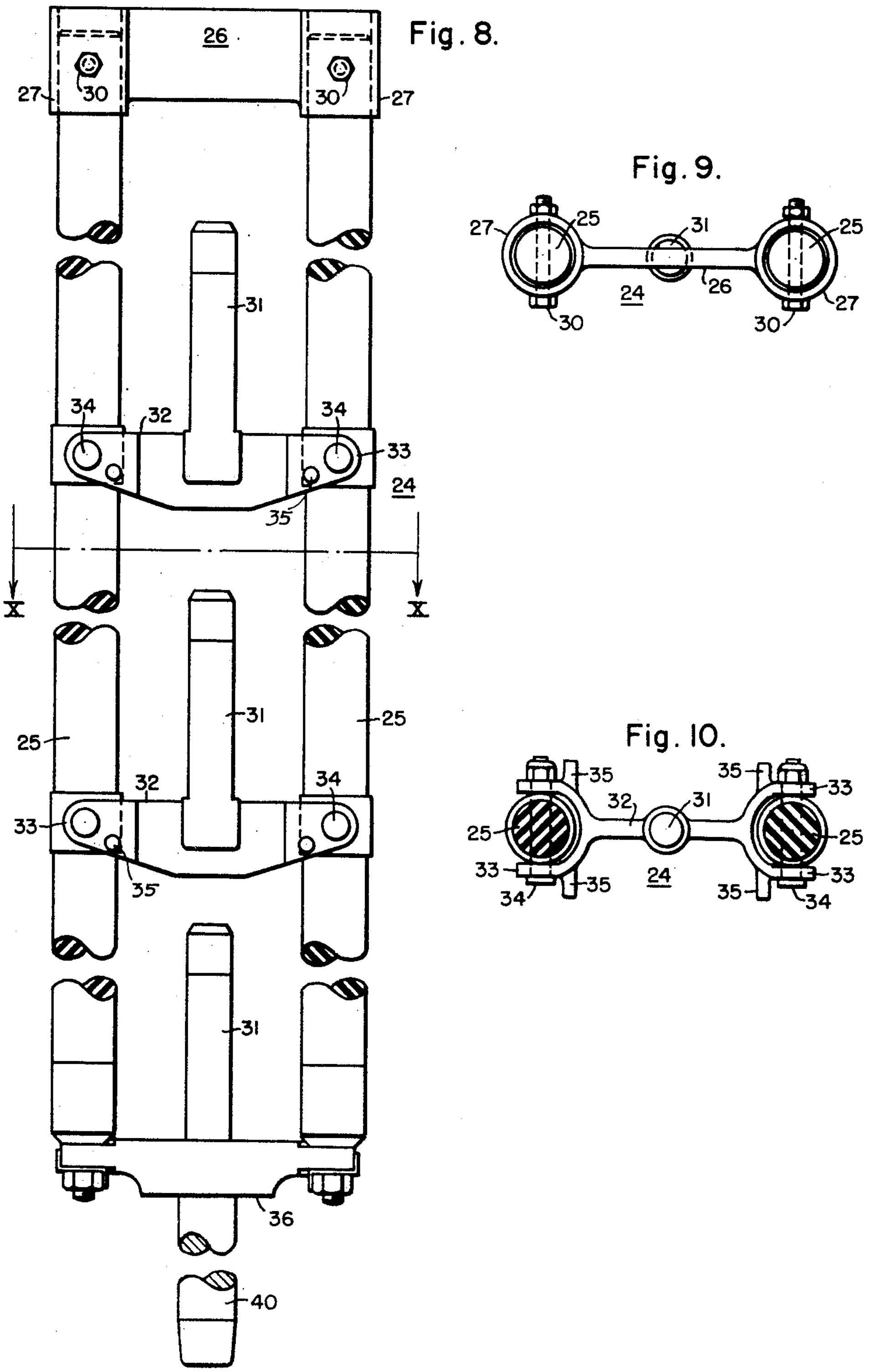
Fig. 8 is a side elevational view of the movable contact assembly utilized in my invention.
Fig. 9 is a top plan view of the movable contact assembly illustrated in Fig. 8.
Fig. 10 is a sectional view taken along the line X—X of Fig. 8, looking in the direction of the arrows.

Movable interiorly within the casing 21 of the interrupting assemblage 6 is a movable contact assembly, generally designated by the reference numeral 24, and illustrated more clearly in Figs. 8–10 of the drawings.

Referring to Fig. 8, it will be observed that there is provided a pair of insulating operating rods 25, to the upper ends of which is bolted a saddle assembly 26. The saddle assembly 26 comprises a metallic cross-member having sleeves 27 integrally formed at its outer ends. The sleeves 27 are apertured and accommodate bolts 30, which rigidly secure the upper ends of the operating rods 25 to the saddle brace 26.

Spaced axially along the lengths of the operating rods 25 are a plurality of movable contacts 31, which preferably are provided by a suitable casting having a cross-piece 32, the ends of which are bifurcated, as shown in Fig. 10, to provide legs 33. The legs 33 straddle the operating rods 25 and are clamped thereto by bolts 34. Integrally formed with the cross-piece 32 are a plurality of guide lugs 35, the purpose for which will be more apparent hereinafter.

Disposed adjacent the lower end of the movable contact assemblage 24 is a lower brace 36 having an aperture therethrough, as indicated at 37 in Fig. 3, to accommodate the lower movable contact 31, which is brazed therewithin. It will be observed that the lower movable contact 31 has a depending contact extension 40, which is engaged in abutting manner by a contact 41 disposed at the extremity of the conducting cross-bar 10, as shown in Fig. 3.

Figure 11:
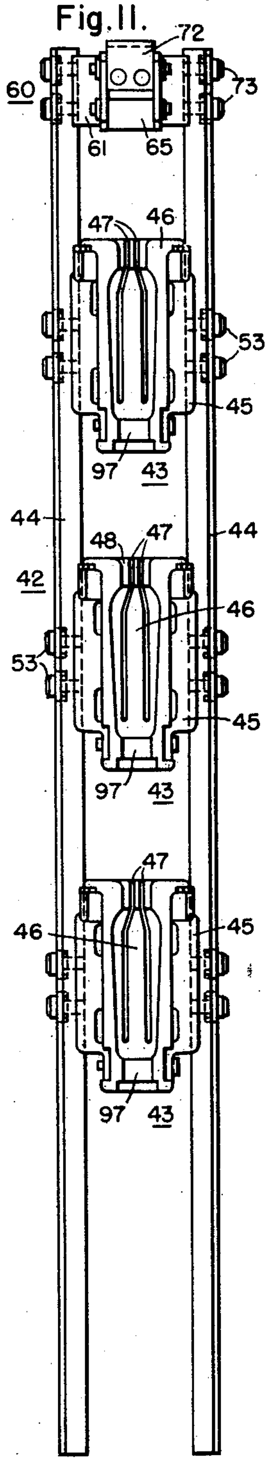
Fig. 11 is a front elevational view of the ladder-like relatively stationary bridging contact assemblage utilized in my invention.
Figure 12:
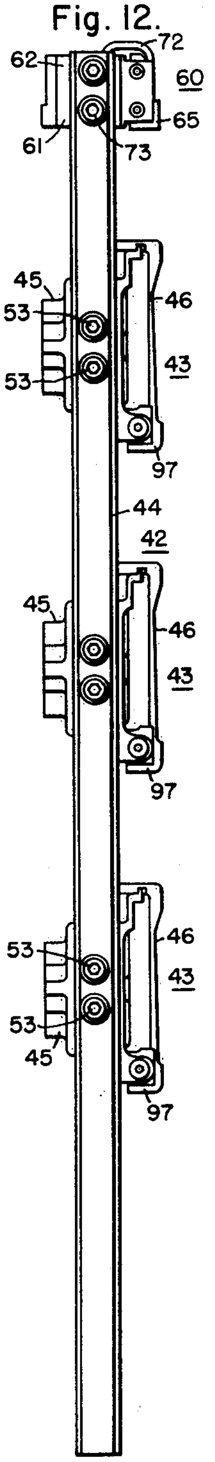
Fig. 12 is a side elevational view of the relatively stationary bridging contact assemblage shown in Fig. 11.
Figure 4:
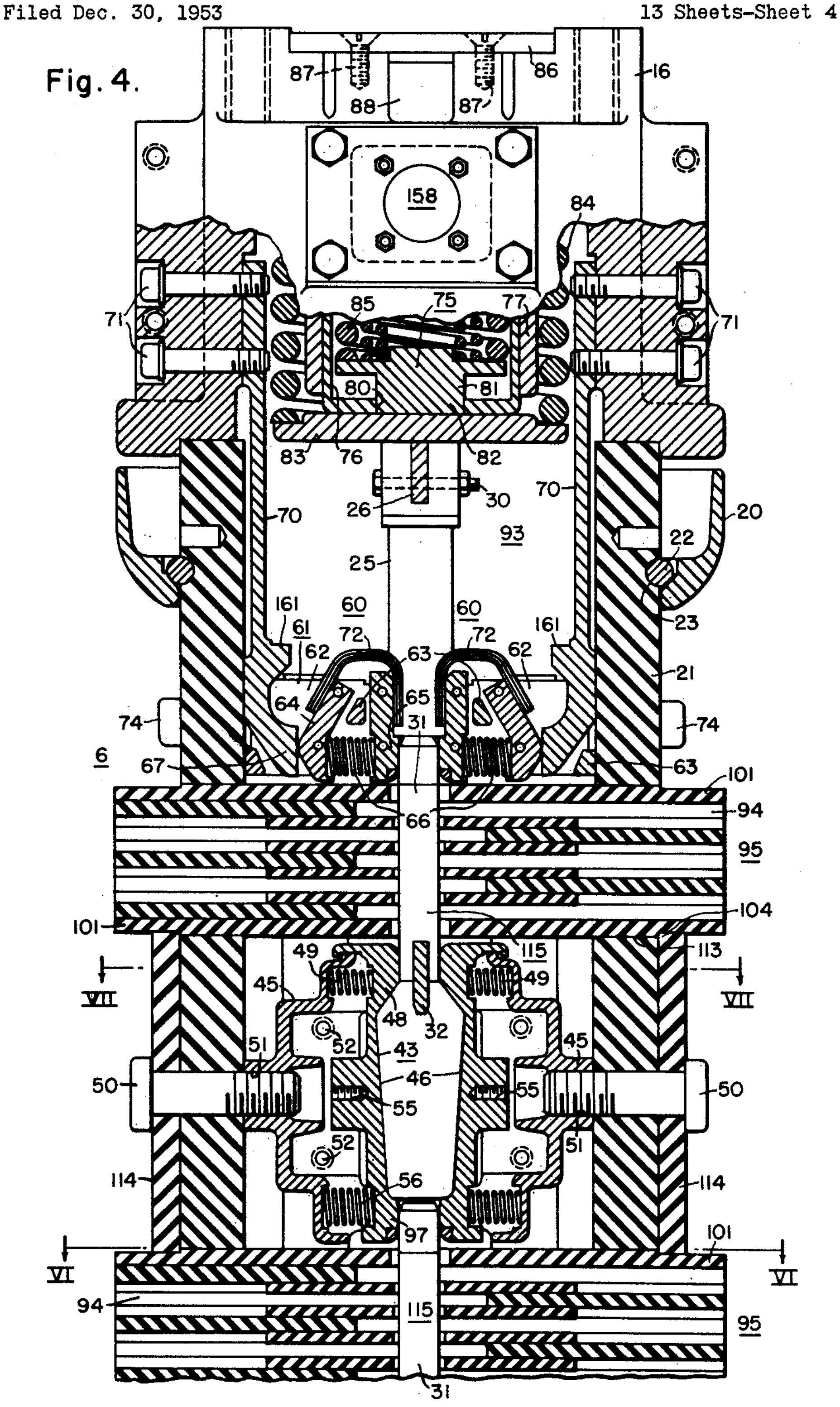
Fig. 4 is a vertical sectional view taken through the upper portion of the left-hand interrupting assembly of Fig. 1, substantially along the line IV—IV of Fig. 2.
Figure 5:
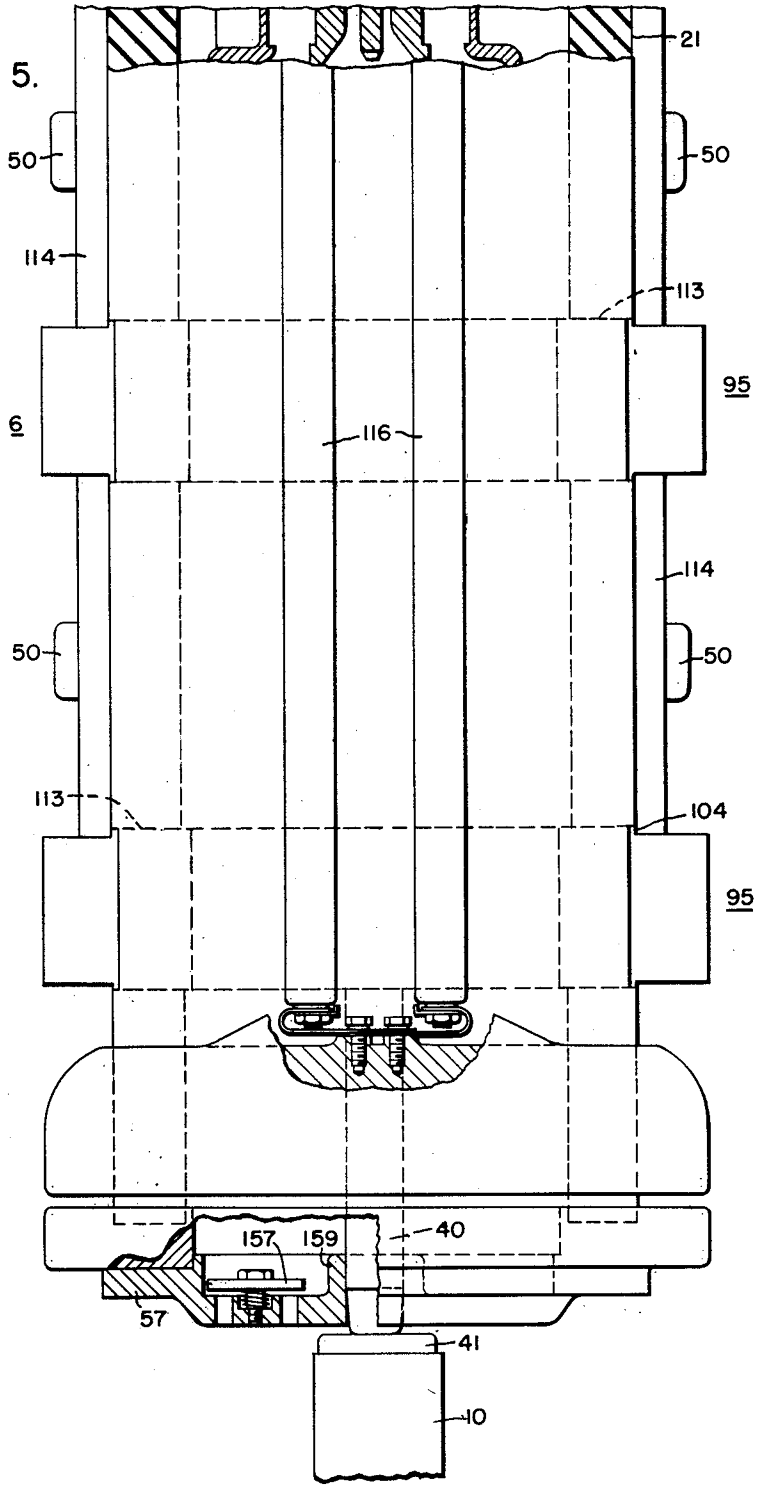
Fig. 5 is a side elevational view taken at right angles to that illustrated in Fig. 3, and illustrating the lower portion of the interrupting assembly of Figs. 2–4, with the contact structure being indicated in the closed-circuit position.

Disposed interiorly within the casing 21 of the interrupting assemblage 6 is a pair of ladder-like relatively stationary intermediate contact assemblages, generally designated by the reference numeral 42 in Figs. 11 and 12 of the drawings. With particular reference to Figs. 11 and 12, it will be noted that the relatively stationary bridging contact assemblage 42 comprises a plurality of relatively stationary bridging contacts 43, which are spaced along two insulating bars 44, as shown in Fig. 11. The bridging contacts 43, as shown more clearly in Fig. 4, comprise a support bracket 45 and an intermediate bridging contact 46. As shown in Fig. 4, the bridging contact 46 of one intermediate contact assemblage 42 cooperates with the bridging contact 46 of the oppositely disposed intermediate contact assemblage 42. The upper end of each intermediate bridging contact 46 is slotted, as shown at 47 in Fig. 11. This slotted construction is described and claimed in United States patent application, Serial No. 401,142, filed Dec. 30, 1953, now United States Patent 2,790,880, issued April 30, 1957 to Fritz E. Florschutz and Carl J. Lentjes, and assigned to the assignee of the instant application.

Figure 7:
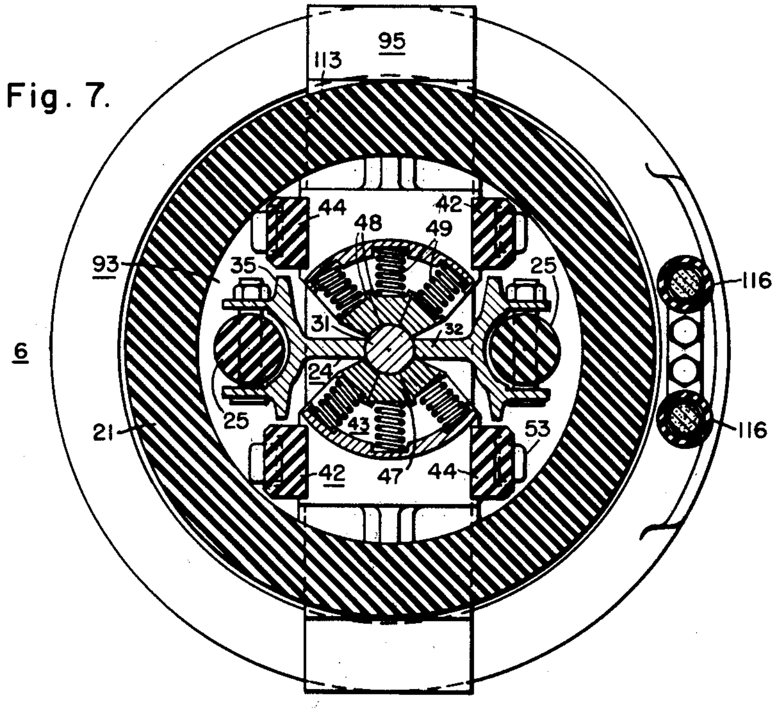
Fig. 7 is a sectional view taken substantially along the line VII—VII of Fig. 4, looking in the direction of the arrows.

As observed in Fig. 4, the segmental upper contact portions 48 are each resiliently biased inwardly by a contact compression spring 49, as shown more clearly in Figs. 4 and 7 of the drawings. This provides a flexible contact bearing action upon the side of the movable contact 31, as indicated in Fig. 4. The lower end of each intermediate bridging contact 46 is solid, as indicated in Fig. 11, and cooperates with the immediately adjacent lower movable contact 31 to establish an arc. Arcing occurs only at the lower end of each bridging contact 46 and not at the upper end thereof, where merely a sliding contacting action takes place.

It will be obvious from the foregoing discussion that, in effect, each intermediate bridging contact 46 conducts the current from the upper movable contact 31 to the immediately adjacent lower movable contact 31, as indicated in Fig. 4 of the drawings. Insulating bolts 50, as shown in Fig. 4, extend through the side walls of the casing 21 and thread into tapped apertures 51 provided in the support brackets 45. Also, each support bracket has two pairs of tapped mounting apertures 52 (Fig. 4), which accommodate mounting bolts 53 (Fig. 11) to secure the bridging contacts 43 in spaced relation along the insulating bars 44.

As shown in Fig. 30, the insulating bolts 50, which secure the ladder-like intermediate contact assemblage 42 to the interior wall of the casing 21, may be removed, and in their place retracting bolts 54 may be employed. The inner end of each retracting bolt 54 is threadedly secured into a tapped aperture 55 of the support bracket, as shown in Figs. 4 and 30 of the drawings. By turning the retracting bolt 54, the intermediate bridging contact 46 may be laterally moved outwardly against the spring pressure exerted by the three contact compression springs 49 at the upper end thereof, and by the single contact compression spring 56 at the lower end thereof, to thereby enable the movable contact assemblage 24 to be drawn downwardly out of the lower end of the casing 21 after, of course, the lower metallic closure plate 57 has been removed.

Disposed at the upper end of each ladder-like intermediate bridging contact assemblage 42 is a contact guide support 60. The contact guide support includes a box-like casting 61 having side walls 62, which are interconnected by a pair of braces 63 integrally formed with the box-like casting 61. The contact guide support 60 supports a pair of finger contacts 64, 65, which are biased apart by a single spring 66, as shown more clearly in Fig. 4 of the drawings. The contact finger or relatively stationary disconnecting contact 64 engages the lower end 67 of a contact extension or relatively stationary disconnecting contact 70, the upper end of which is secured by a plurality of bolts 71 to the top casting 16 of the assemblage 6. The inner contact finger 65 bears against the upper end of the top movable contact 31, and cooperates therewith to establish an arc during the opening operation. A flexible strap 72, comprised of thin laminations of copper strap, is riveted to the contact fingers 64, 65 and electrically interconnects them.

During the assembling operation, when the ladder-like intermediate contact assemblage 42 is moved upwardly interiorly within the casing 21 to be secured thereto by the bolts 50, the lower end 67 of the contact extension or disconnecting contact 70 enters the box-like casting 61 to make contacting engagement with the contact finger or disconnecting contact 64, as shown in Fig. 4. Thus, the assemblage 42 is rapidly moved to the correct position without interfering with the contact extension 70 or with the alignment of the casing 21. This feature of employing a box-like casting 61 to assist in guiding the assemblage 42 in cooperation with the contact extension 70 is claimed in the aforementioned application of Florschutz and Lentjes.

It is to be noted that by the particular configuration of the two finger contacts 64, 65, which form a partial loop, during the existence of heavy current passing through the interrupter, the contact pressure afforded by the spring 66 will be assisted in pressing the finger contacts 64, 65 outwardly by the magnetic forces exerted by the current flow which passes through the finger contacts 64, 65 in the partial loop circuit. As well known by those skilled in the art, a current passing in a loop circuit tends to expand the loop, and this property is employed to advantage by the construction shown in Fig. 4, to increase the contact pressure during the passage through the interrupter of heavy load currents.

As observed in Figs. 11 and 12, the contact guide support 60 may be secured by bolts 73 to the insulating bars 44 by suitable tapped apertures which extend into the side walls 62 of the box-like casting 61. Also, the box-like casting 61 has a pair of tapped mounting apertures, not shown, which accommodate mounting bolts 74 (Fig. 4), which pass through the side walls of the casing 21.

Figure 6:
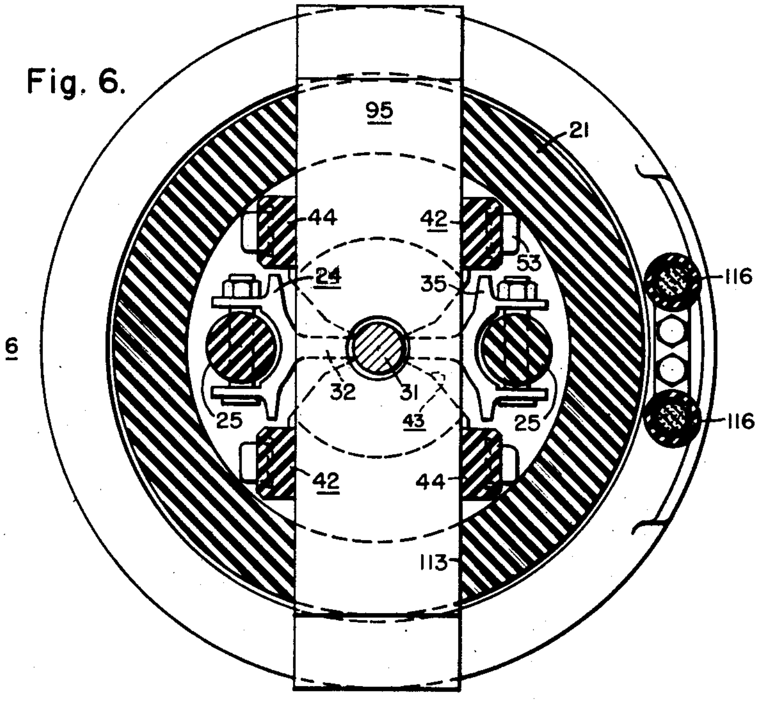
Fig. 6 is a sectional view taken substantially along the line VI—VI of Fig. 4.

It will be noted that the vertical reciprocal movement of the movable contact assemblage 24 is guided by the guide lugs 35 disposed on the cross-pieces 32, which are guided along the insulating bars 44 in a manner more readily apparent from an inspection of Figs. 6 and 7 of the drawings. Naturally, of course, the movable contact assemblage 24 is also guided by the bridging contacts 43, as also indicated in Figs. 6 and 7.

Figure 13:
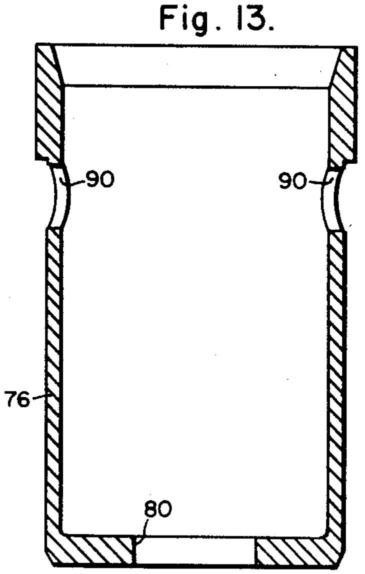
Fig. 13 is a vertical sectional view through the piston employed in my improved circuit interrupter.
Figure 15:
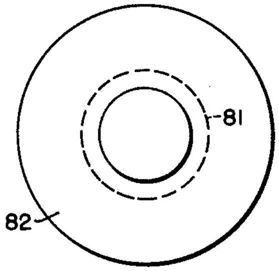
Fig. 15 is a top plan view of the spring seat shown in Fig. 14.
Figure 14:
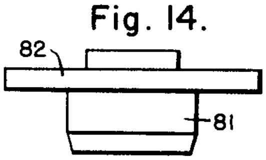
Fig. 14 is a side elevational view of a spring seat.
Figure 19:
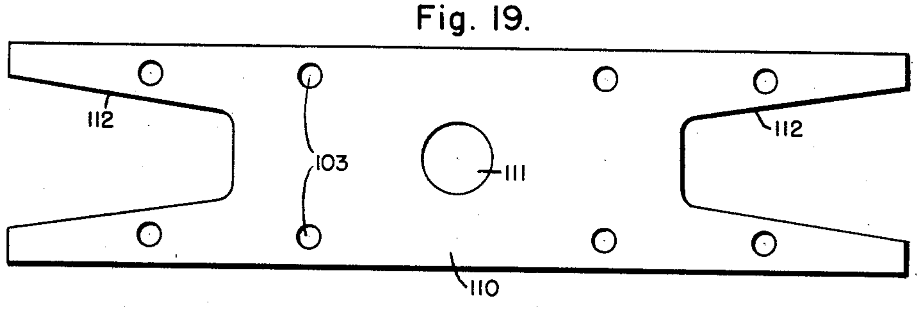
Figs. 19–21 illustrate plate details employed in the extinguishing unit of Figs. 16–18.

Disposed at the upper end of the interrupting assemblage 6 is a piston means, generally designated by the reference numeral 75, and including a piston 76 (Fig. 13) which is guided by a downwardly extending cylinder portion 77 of the casting 16, as shown in Fig. 2. The piston 76 has an aperture 80 to accommodate an extension 81 of a spring seat 82, shown in detail in Figs. 14 and 15 of the drawings. The lower end of the extension 81 bears against a circular spring plate 83, which is picked up by the saddle assembly 26 of the movable contact assemblage 24 during the closing operation. The spring plate 83 is biased downwardly by an accelerating compression spring 84, as shown in Fig. 2. Consequently, the accelerating spring 84 not only biases the spring plate 83 downwardly, but also the movable contact assemblage 24 as well. The spring seat 82 is biased downwardly by a battery of compression springs 85, which seat at their upper ends against a plate 86, which is secured by screws 87 to the top casting 16. As observed in Figs. 2 and 4, an opening 88 is provided in the top casting 16, which opens to the region 89 in back of the piston 76. The piston 76 also has apertures 90 to prevent compression of the oil within the region 91 interiorly of the cylinder portion 77 of the casting 16, as shown in Fig. 2. A stop bolt 92 may be screwed to the plate 86, as shown in Fig. 2.

The accelerating spring 84 acts independently of the battery of springs 85 during the existence of high arcing pressure within the region 93 within the casing 21. In other words, the accelerating spring 84 will cause downward opening movement of the movable contact assemblage 24, and hence, opening movement of the contacts 31, even though the arcing pressure within the region 93 stalls the piston 76 and prevents it from moving downwardly. It is only during the existence of relatively low arcing pressure within the region 93 within the casing 21 that the battery of compression springs 85 is effective to move the spring seat 82 downwardly, and hence carrying the piston 76 therewith following a predetermined time delay, as afforded by the distance "S" in Fig. 2. In other words, the piston 76 is not picked up by the spring seat 82 until the spring seat 82 has traversed the distance "S." As a result, there is a predetermined time delay before actuation of the piston means 75.

As will be brought out more clearly hereinafter, during the existence of high arcing pressure within the region 93, during heavy load current interruption, or during the interruption of heavy overload currents, the piston means 75 will be ineffective. Following a subsidence of the pressure within the region 93, the piston means 75 will then become effective to provide a flushing flow of clean liquid out through the vents 94, associated with the arc-extinguishing units 95, more fully explained hereinafter. During the interruption of relatively low-amperage currents, where there is little arcing pressure, the piston means 75 will be effective at this time, to send liquid flow into the several arcs and out through the vents 94 associated with the interrupting units 95.

With the construction as shown in Fig. 2, the piston 76 is not picked up until at approximately the same time that the movable contacts 31 establish arcing with the lower ends of the bridging contacts 46. By varying the distance "S," it would be possible to provide a liquid flow prior to the establishment of arcing, or, should it be desirable, the distance "S" could be increased to provide a predetermined time delay before application of the piston 76, at which time the arcs would have a predetermined length. The advantages of delaying the piston for a predetermined time during the interruption of charging currents is set out and claimed in United States Patent 2,592,635, issued April 15, 1952 to Winthrop M. Leeds, Robert E. Friedrich, and Francis J. Fry, and assigned to the assignee of the instant application. The teachings of this patent could be utilized by regulating the length of the distance "S."

The electrical circuit through the interrupter will now be described. The circuit includes the terminal stud 14 extending interiorly through the terminal bushing 4, the contact foot 12, upper casting 16, contact extension 70, and through contacting portion 67 thereof to contact finger 64. The circuit then extends through the shunt 72 to the contact finger 65, thence through the upper movable contact 31 and through the upper intermediate contact 46 to the next movable contact 31. The circuit extends through the next lowermost intermediate contact 46 and so onwardly to the bottom movable contact 31, thence through the contact extension 40 to the conducting cross-bar 10. The circuit extends through the right-hand interrupting assembly 7 in a similar manner to the right-hand terminal stud 96 of the terminal bushing 5.

During the opening operation, suitable means, either responsive to the passage of overload currents passing through the interrupter, or in response to the wishes of a station attendant, operates to cause downward opening motion of the insulating operating rod 11. This carries the cross-bar 10 downwardly, permitting the accelerating compression spring 84 to move the spring plate 83 downwardly carrying with it the movable contact assemblage 24. This causes an arc to be established between the upper movable contact 31 and the contact finger 65 of the contact guide support 60. Simultaneously, with this arc establishment, there occurs arc establishment between each of the lower movable contacts 31 and the lower end 97 of each intermediate contact 46.

To assist in arc interruption, there is provided a plurality, in this instance four, arc-extinguishing units, or arc-rupturing structures 95. These arc-extinguishing units 95 are of substantially block shape, as indicated in Figs. 2, 3, and 18 of the drawings. Each of the arc-extinguishing structures 95 includes a plurality of suitably configured fiber plates cemented together, and having dowel pins 100 of fiber passing therethrough. The cemented construction holds the plates in position, making a stronger construction and also prevents fluid leaking between the plates.

The broad concept of utilizing such an arc-extinguishing unit 95 extending diametrically across the casing 21 and supported within the walls thereof is described and claimed in United States patent application filed May 15, 1951, Serial No. 226,507, now U. S. Patent 2,673,272, issued March 23, 1954 to George B. Cushing, entitled "Circuit Interrupter" and assigned to the assignee of the instant application.

Figure 20:
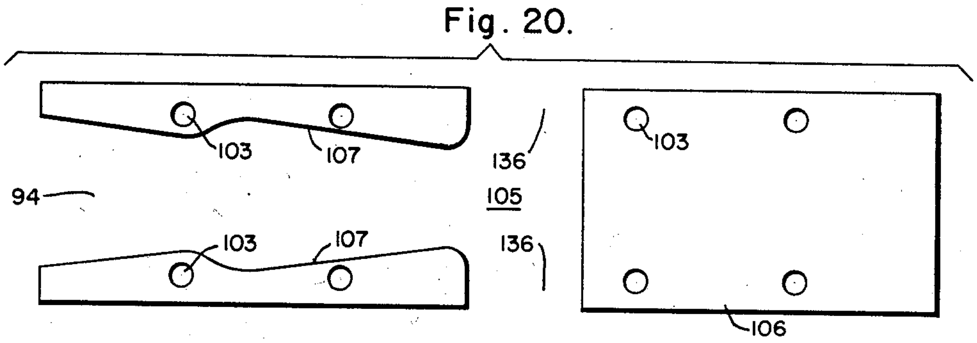
Figure 21:
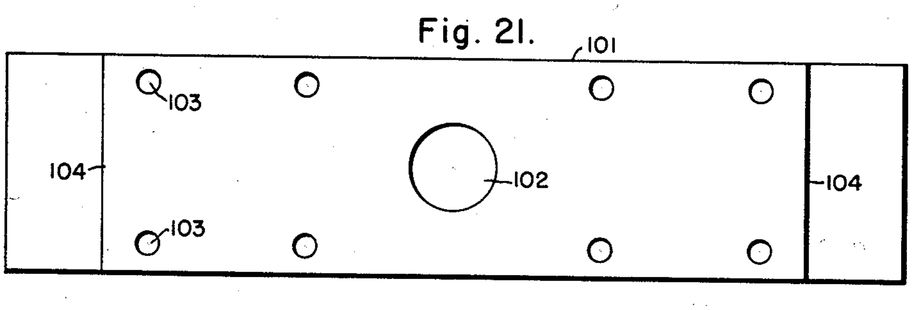
Figure 24:
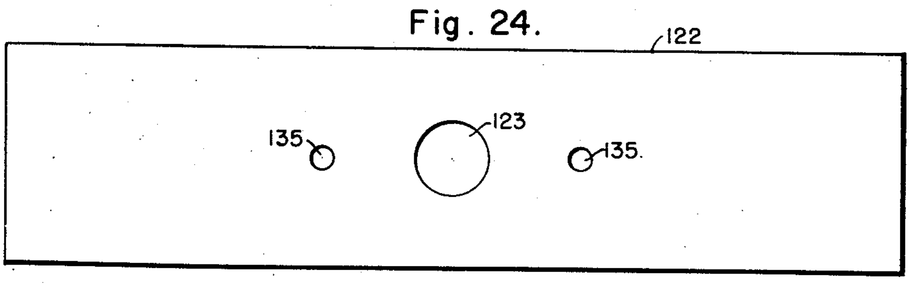
Figs. 24–26 illustrate plate details which are used in the modified type of arc-extinguishing unit illustrated in Figs. 22 and 23.

With particular reference to Figs. 16–21, which illustrate the plate details, it will be noted that the top and bottom plates of the unit 95 are designated by the reference numeral 101 in Fig. 21. As shown, a central aperture 102 is provided, which is enlarged with respect to the diameter of the movable rod-shaped contact 31, for a purpose to be described hereinafter. It will be noted that the fiber plate 101 has a plurality of holes 103 therein to accommodate the dowel pins 100, and the ends of the plate 101 are machined-off slightly to form shoulders 104 (Fig. 17) for a purpose to be described hereinafter.

Immediately below the top plate 101 is a vent plate, generally designated by the reference numeral 105, and illustrated in Fig. 20 of the drawings. It will be noted that the vent plate 105 is composite in structure, including a rectangular plate portion 106 and a pair of vent strips 107. The plates 107 and 106 have the holes 103 to accommodate the dowel pins 100. Then follows an orifice plate, designated by the reference numeral 110, and shown in Fig. 19 of the drawings. The orifice plate 110 has a central hole 111, which is smaller than the hole 102 in the top plate 101, and through which the movable contact 31 passes with slight clearance. Then follows a second vent plate 105, which is turned 180° around with respect to the first-mentioned vent plate 105. This is followed by a second orifice plate 110, and a third vent plate 105, which is oriented in the same direction as the first vent plate 105. The structure then repeats, as indicated in Fig. 17, to the bottom plate which is identical to the top plate and is, of course, designated by the reference numeral 101. The orifice plates 110 have cutout portions 112, which cooperate with the vent strips 107 of the vent plate 105 to result in an enlarged vent or exhaust passage 94, as shown more clearly in Figs. 4 and 17 of the drawings.

The extinguishing unit 95 passes through openings 113 provided in the side walls of the casing 21, and clamping plates 114 of insulated material are held by the mounting bolts 50 up against the shoulders 104 of the top and bottom plates 101 to prevent the extinguishing unit 95 from sliding laterally out of the casing 21.

The functioning of the several plates in the extinguishing unit 95 will now be described. During the opening operation, the movable contacts 31 move downwardly through the holes 102, 111 in the plates 101 and 110, respectively, thereby drawing an arc through the central arc passage 115 of the extinguishing unit 95. The arc, not shown, will react upon the oil in the immediate vicinity thereof, and will create a pressure which may be high or low in accordance with the amperage of the current passing through the arc. The arc pressure will react through the enlarged openings 102 in the top and bottom plates 101 and also through passages 136 in plate 105 to create an arc pressure which extends throughout the interior 93 of the casing 21. During heavy current interruption, the piston means 75 may be stalled, as previously noted, and in that event, the pressure generated will be adequate to force a turbulent flow of liquid and gas out of the extinguishing unit 95 through the laterally-disposed vents 94. It will be noted that the disposition of the rectangular portion 106 of the vent plate 105 back from the arc passage opening 115 permits an adequate supply of liquid to be disposed immediately adjacent to the arc. The orifice plates 110 insure that the arc stream will be confined to the holes 111 of the orifice plates 110 and assist in directing the oil flow against the arc. Arc extinction soon follows. During the interruption of heavy overload currents, following arc extinction, the piston means 75 will then become available and operative to force liquid through the extinguishing units 95 and out of the casing 21 through the exhaust passages 94.

During the interruption of relatively low currents, the piston means 75 will immediately become operative to send a piston-actuated flow of oil into the units 95 through the enlarged orifices 102 in plates 101 and through inlet openings 136 in vent plates 105 and against the arc streams. This flow will subsequently pass out of the extinguishing units 95 by way of the vent passages 94.

A desirable feature of the arc-extinguishing unit 95 is that it may be removed and turned over so that the plate 101, which was on the top, will then be on the bottom and vice versa. In other words, in the fully open circuit position of the interrupter the mounting bolts 50 may be loosened to permit rotation of the clamping plates 114. The units 95 may then be moved laterally out of the casing 21 and turned about, as mentioned, and reinserted within the holes 113 in the casing 21 with the plate 101, which was on the top, now on the bottom in the new position. The result will be a new set of unburned orifices 102, 111 at the upper end of the arcing passage 115 of the arc-extinguishing unit 95. This will prolong the operational life of the interrupter without requiring new arc-extinguishing devices 95.

To assist in dividing the voltage between the interrupting assemblies 6, 7 during the opening operation, there is provided laterally of each casing 21 a pair of resistor tubes 116 in electrical parallel, as shown more clearly in Figs. 6 and 7 of the drawings. The resistor tubes 116 comprise a plurality of carbon-impregnated blocks having a proper resistance value. The residual current, which passes through the resistor tubes 116 following extinction of the several arcs within the casing 21, is of unity power factor, and is easily interrupted between the contact 41 of the cross-bar 10 and the contact extension 40 at the lower end of the assemblage 6 (Fig. 3). As is usual, the cross-bar 10 moves downwardly to an isolating position at the end of the opening operation, establishing thereby two isolating gaps in clear oil at the bottom of the tank 1.

It will be noted that there was provided an extinguishing unit 95 for each interrupting break within the casing 21. In certain applications, it may be desirable to reserve one or more of the arcs to serve exclusively as pressure-generating arcs, thereby establishing additional pressure throughout the interior 93 of the casing 21. The pressure established at these one or more breaks will then serve to force oil out through the extinguishing units 95 associated with the remaining breaks of the assemblage.

Figure 31:
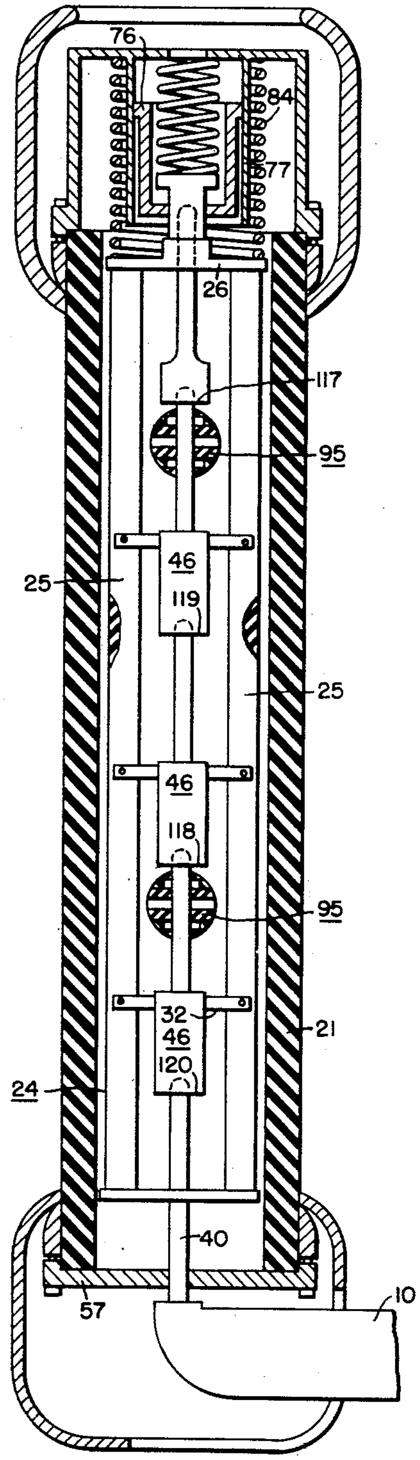
Fig. 31 is a somewhat diagrammatic view of the arc-extinguishing assemblage of Figs. 2–5 illustrating how one or more of the breaks may be utilized as a pressure-generating break with the omission of one or more of the arc-extinguishing units.

Such a construction is diagrammatically illustrated in Fig. 31, where the first and third breaks represented by the reference characters 117, 118 are interrupting breaks, and have extinguishing units 95 associated therewith, whereas the second and fourth breaks represented by the reference characters 119, 120 may serve as pressure-generating breaks. The structure is similar to that heretofore described, and the only essential difference is to omit the holes or openings 113 in the casing 21 opposite the second and fourth breaks 119, 120 so that these breaks will serve as pressure-generating breaks, whereas the first and third breaks 117, 118 may serve as interrupting breaks. Instead of employing two pressure-generating breaks 119, 120, only a single break may be adequate in certain applications, the others all serving as interrupting breaks.

Figure 22:
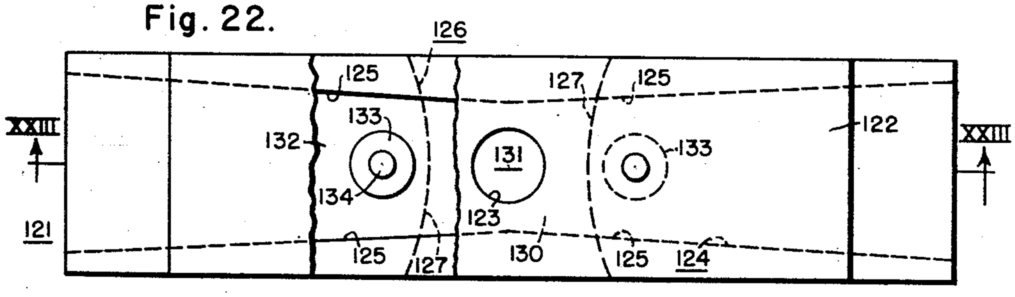
Fig. 22 is a top plan view, partially in section, of a modified type of arc-extinguishing unit, which may be utilized in the circuit interrupter embodying my invention.
Figures 23, 25:
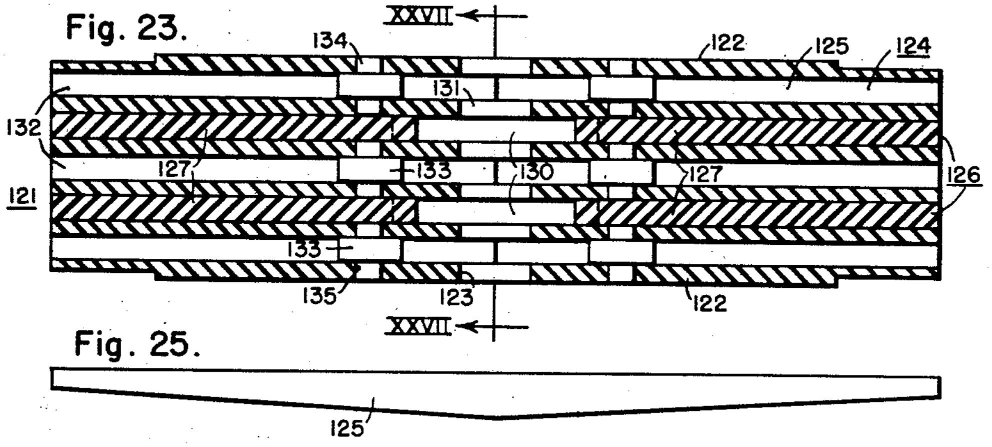
Fig. 23 is a vertical sectional view taken along the line XXIII—XXIII of Fig. 22.
Figure 26:
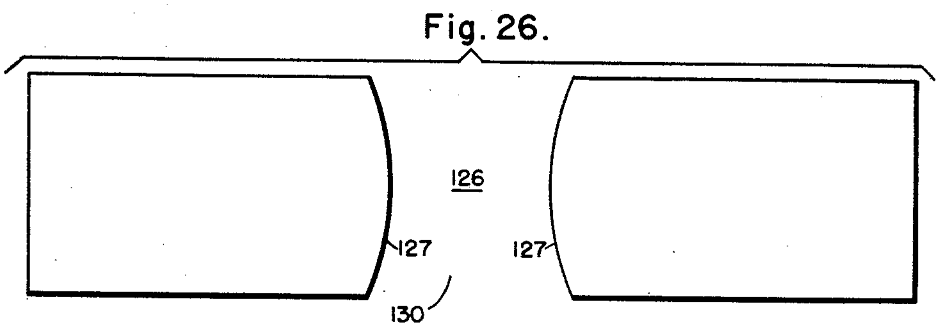
Figure 27:
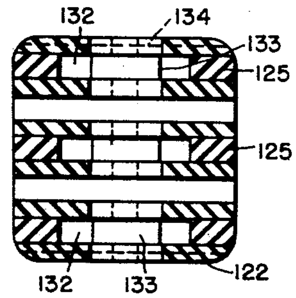
Fig. 27 is a vertical sectional view taken substantially along the line XXVII—XXVII of the modified arc-extinguishing unit of Fig. 23.

Figs. 22–29 illustrate a modified type of extinguishing unit, generally designated by the reference numeral 121. This unit 121 may take the place of the extinguishing units 95 heretofore described. The modified unit 121 comprises six plates of the type illustrated in Fig. 24 and having the reference numeral 122. For convenience, these plates may be designated orifice plates. Each orifice plate 122 has an aperture 123 through which the movable contact 31 passes with relatively slight clearance. Below the top orifice plate 122 is a composite vent plate, generally designated by the reference numeral 124. The composite vent plate 124 includes two spaced vent strips 125 (Fig. 25) of insulating material, which are spaced laterally apart, as indicated in Fig. 22 of the drawings. Then follows a second orifice plate 122 which is in turn followed by an inlet plate of composite construction, and designated by the reference character 126. The inlet plate 126 includes two laterally spaced inlet sections 127, which are spaced apart so as to form an inlet passage 130 which communicates between the arcing passage 131 of the extinguishing unit 121, and the interior 93 of the casing 21. Thus, liquid may flow through the inlet passages 130 provided by the laterally spaced inlet sections 127 and into the arc passage 131. The liquid is maintained in intimate contact with the established arc by the provision of the orifices 123 of the orifice plates 122. As indicated in Figs. 22 and 23, the inlet passages 130 are spaced throughout the structure and interspersed with the vent passages 132 provided by the composite vent plates 124.

Figure 28:
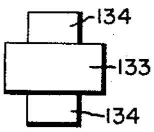
Fig. 28 is a side elevational view of a spacer employed in the extinguishing unit of Figs. 22 and 23.
Figure 29:
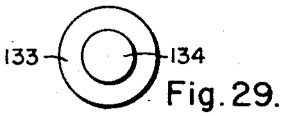
Fig. 29 is a top plan view of the spacer shown in Fig. 28.

To prevent possible collapse of the extinguishing unit 121 due to the relatively low pressure in the exhaust or vent passages 132, as compared to the high pressure within the interior 93 of the casing 21, there are provided spacers 133, more clearly shown in Figs. 28 and 29, which are disposed within the vent passages 132 in a manner more clearly shown in Fig. 23 of the drawings.

It will be noted that each spacer 133 has associated therewith a pair of dowel portions 134, which pass through apertures 135 provided in the several orifice plates 122.

It is, of course, obvious that if the units 95 or 121 are employed as interrupting units adjacent the interrupting breaks in a structure, as indicated in Fig. 31, that the liquid flow created by the pressure-generating breaks 119, 120 in such an arrangement will cause the liquid to pass inwardly toward the arcing passage 115 through the inlet passages 136 provided by the composite vent plates 105 and orifice 102, or through the inlet passages 130 of the composite inlet plate 126 in the unit 121 of Figs. 22 and 23.

This inwardly directed oil, under pressure, will engage the arc and will exhaust from the units 95 through the vent passages 94, or from the unit 121 through the exhaust passages 132.

Figure 34:
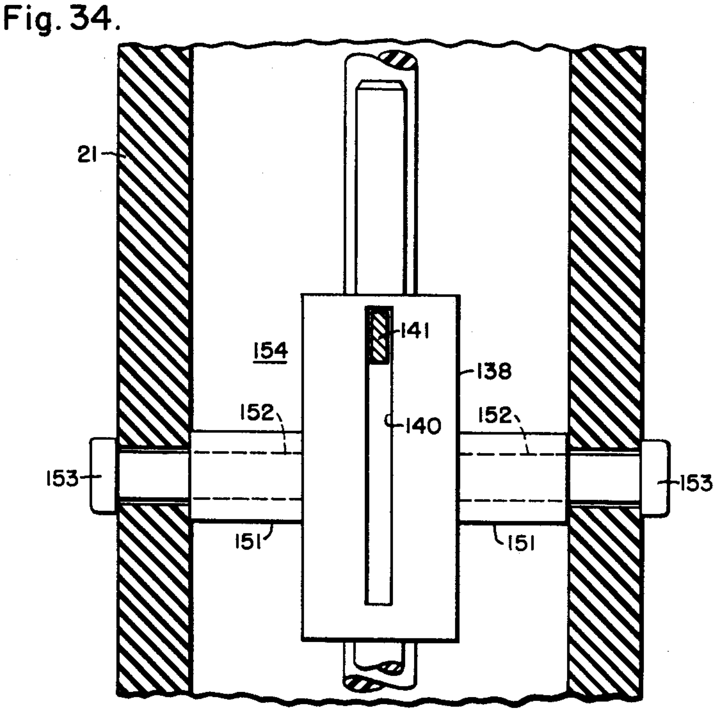
Fig. 34 is a fragmentary vertical sectional view taken substantially along the line XXXIV—XXXIV of the interrupter of Fig. 33.
Figure 33:
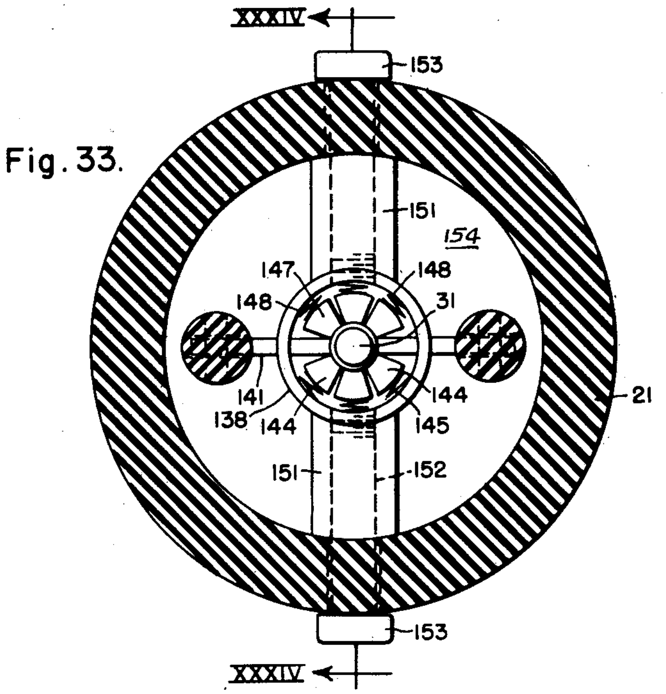
Fig. 33 is a sectional view taken substantially along the line XXXIII—XXXIII of Fig. 32, looking in the direction of the arrows.
Figure 32:
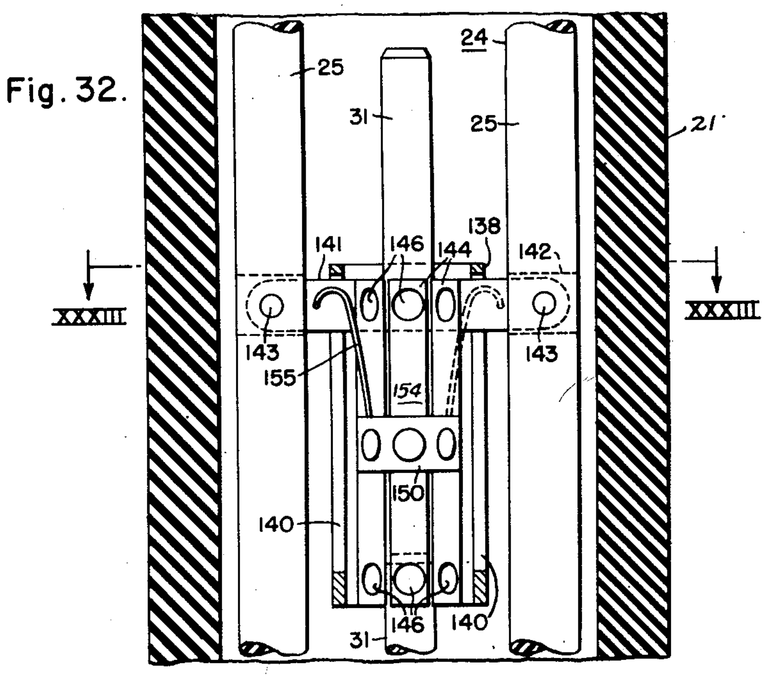
Fig. 32 illustrates a fragmentary vertical sectional view through a modified type of circuit interrupter employing a different form of intermediate bridging contact assemblage, with the contact structure being shown in the closed-circuit position.

Figs. 32–34 illustrate a modified type of intermediate bridging contact construction, which may be employed in place of that illustrated in Figs. 11 and 12 of the drawings. Referring to Figs. 32–34, it will be observed that there is provided a relatively stationary metallic tube 138 having diametrically disposed slots 140 provided therein. The braces or cross-pieces 141, analogous to the cross-pieces 32 of Fig. 8, pass along the slots 140 and support the movable contacts 31. The cross-pieces 141 are disposed in recesses 142 provided in the operating rods 25 and are bolted thereto by bolts 143.

Disposed interiorly within the slotted metallic tube 138 are two sets of contact fingers, more clearly shown in Fig. 33. The lower set are designated by the reference numeral 144, and each is biased inwardly at its top and bottom by contact compression springs 145. The contact compression springs 145 have their inner ends seated in recesses 146 provided in the back sides of the contact fingers 144. The top set of contact fingers, indicated by the reference numeral 147 in Fig. 33, are likewise biased inwardly toward the contact 31 by contact compression springs 148, which are likewise seated in cavities provided at the ends of the contact fingers 147 and in the tube 138.

Preferably, the top and bottom set of contact fingers 144, 147 are each electrically interconnected by flexible connectors or straps 150. One strap 150 electrically interconnects the lower set of contact fingers 144, and a separate strap 150 electrically interconnects the upper set of contact fingers 147 on the other side of the slots 140. Thus, should one finger of a particular set make engagement at its top with the upper contact 31 to the exclusion of the other fingers, the current may pass through the centrally disposed conducting strap 150 to the other contact fingers of the same set, which may make engagement with the lower movable contact 31.

As shown in Fig. 33, the metallic tube 138 may be centrally positioned within the casing 21 by positioning cylinders 151, having bores 152, through which pass mounting bolts 153. The particular construction shown assists in guiding the vertical motion of the movable contact assemblage 24, and also assists in providing the proper contact pressure between the contacts. Moreover, the construction has the advantage that the movable contact assemblage 24 may be removed from the casing 21, together with the intermediate bridging contact assemblage 154 comprising the fingers 144, 147. The operation may then be viewed externally of the casing 21 to insure proper contact pressure and alignment.

In certain instances, it may be desirable to include a conducting shunt 155 electrically interconnecting each flexible strap 150 with the metallic brace 141 so that this will insure positive electrical interconnection between the movable contact 31 and the bridging contact assemblage 154. The shunts 155 may not be necessary, but if they are necessary, it is, as shown, far more easy to add them to the construction shown in Figs. 32–34 than it would be to add them to the construction illustrated in Figs. 11 and 12 of the drawings.

From the foregoing description, it is apparent that I have provided an improved circuit interrupter particularly adapted for the interruption of high powers, and which may be assembled and disassembled readily. The arc-extinguishing units 95 and 121 are so efficient that circuit interruption may be accomplished in the order of three cycles. As shown, the arcs are established substantially simultaneously for rapid interruption. A spring-driven oil pump at the top of the assembly provides oil flow to each break for the interruption of line charging currents without arc restriking. Also, this pump performs a flushing action immediately following each fault interruption, clearing out all gas and arc products to prepare for another operation within a fraction of a second, if required.

Attention is also directed to the removable laminated and cemented fiber blocks which guide the oil flow at the arcing region of each contact gap and provides the exhaust vent channels. Sufficient oil storage is provided close to the arc to produce self-generated deionizing action for high current interruption. When any one of the blocks is withdrawn, the contacts can be inspected and observed while being opened or closed. If further disassembly is desired for replacement or maintenance, the removal of a few screws 156 allows the bottom casting 57 to be taken off, and the moving and stationary contact sub-assemblies drawn out, as shown in Figs. 8 and 11. In no case is it necessary to disturb the alignment of the tube 21 and piston assembly 75.

Proper contact adjustment is obtained automatically in the closed position of the breaker merely by the correct positioning of the movable contact cross-arm 10, which bridges the contact assemblies 6, 7 in the closed position of the breaker. The heavy-duty, silver-plated finger contacts 46, with arc-resisting silver tungsten surfaces, provide long life and adequate current-carrying ability to meet a possible 2,000 ampere continuous rating. Heat transfer is assisted by convection oil flow entering a normally open check valve 157 at the bottom of each assemblage 6, 7 and out a normally open check valve 158 disposed at the upper end of each casting 16. These check valves 157, 158 are spring biased to the open position, and close immediately upon the attainment of any pressure within the tube 21.

Voltage-grading resistors parallel the interrupter assemblages 6, 7 on each terminal to assist in equalizing the division of voltage during arc interruption.

The construction has additional advantages in that it affords a symmetrical structure relatively small in diameter. The advantages of multibreaks, such as are evident in the interruption of line charging currents, are obtained without the use of mechanical lever systems with their high moments of inertia. The grid and contact structures are readily accessible, as unit subassemblies, for inspection and repair. The problems associated with the dimensional stability of fiber are kept to a minimum. In other words, where grid assemblies are composed exclusively of a plurality of plate laminations, certain swelling or warping may take place, which changes the dimensions of the grid structure, and this must be allowed for. In the present structure, the insulating tube 21 minimizes this difficulty.

In addition, the disclosed structure indicates how flexible braided shunts may be avoided, and finally, the construction lends itself readily to use in other voltage ratings by changing the number of gaps and still using many common items.

As observed in Fig. 3, a dashpot action is obtained near the end of the opening stroke by the upstanding portion 159 of the closure plate 57 entering a recess 160 provided in the cross-brace 36 of the movable contact assemblage 24. A cushioned halt is thereby obtained near the end of the opening operation. This occurs at substantially the same time that the spring plate 83 meets shoulders 161, provided near the lower ends of the contact extensions 70, as indicated in Fig. 4 of the drawings.

The disclosed circuit interrupter is readily adaptable for the control of transmission voltages up to 330 kv. and upwards, and the contact structure, which has been illustrated, is adequate for carrying heavy load currents of up to 2,000 amperes with no more than a 45° C. rise in temperature. The effectiveness of the interrupting assemblies 6, 7 is attested by the fact that they are capable of having a high-speed reclosing time of the order of fifteen cycles. In addition, the contact structure, as disclosed, is capable of having a momentary current-carrying capacity of 69,000 amperes.

Although the disclosed interrupting structure has been indicated to have an extremely high interrupting capacity, and suitable for the interruption of very heavy currents at extremely high voltages, such as 330 kv., it is to be clearly understood that certain aspects of the invention have value when applied to circuit interrupters of lower rating and may be utilized readily in circuit interrupting structures of widely different types.

Although I have shown and described specific structures, it is to be clearly understood that the same were merely for the purpose of illustration, and that changes and modifications may readily be made therein, by those skilled in the art, without departing from the spirit and scope of the appended claims.

I claim as my invention:

1. The combination in a circuit interrupter of an elongated casing, a relatively stationary framework which is removable from the casing and adapted to be secured to the inner wall thereof, said framework supporting a plurality of relatively stationary bridging contacts in spaced relation, a movable contact assemblage including a plurality of rod-shaped movable contacts, means spacing the movable contacts in spaced relation and mechanically interconnecting them so that they will be caused to move simultaneously, a plurality of the bridging contacts electrically bridging a plurality of the movable rod-shaped contacts in the closed-circuit position of the interrupter, the movable contacts establishing arcing at one end of each of a plurality of the bridging contacts, and the other ends of said plurality of bridging contacts bearing against the sides of adjacent movable rod-shaped contacts.

2. The combination in a circuit interrupter of an elongated casing, a pair of relatively stationary frameworks which are removable from the casing and which are adapted to be secured to the inner wall thereof, said pair of frameworks supporting a plurality of relatively stationary bridging contacts in spaced relation, a movable contact assemblage including a plurality of rod-shaped movable contacts, means spacing the movable contacts in spaced relation and mechanically interconnecting them so that they will be cause to move simultaneously, a plurality of the bridging contacts electrically bridging a plurality of the movable rod-shaped contacts in the closed-circuit position of the interrupter, the movable contacts establishing arcing at one end of each of a plurality of the bridging contacts, and the other ends of said plurality of bridging contacts bearing against the sides of adjacent movable rod-shaped contacts.

3. A liquid-break circuit interrupter including an elongated casing, a movable contact assemblage including a pair of insulating operating rods, interconnecting supports having movable rod-shaped contacts secured to the mid-portion thereof, a contact extension disposed at one end of the movable contact assemblage, an actuating member for striking the contact extension and hence moving the movable contact assemblage to the closed-circuit position, the rod-shaped contacts being spaced along the movable contact assemblage, a framework adapted to be secured to the inner wall of the casing and carrying a plurality of spaced intermediate bridging contacts, one end of a plurality of the bridging contacts establishing arcing with a plurality of the rod-shaped movable contacts, and the other ends of the last-mentioned bridging contacts bearing against the sides of adjacent movable rod-shaped contacts.

4. A liquid-break circuit interrupter including an elongated casing, a movable contact assemblage including a pair of insulating operating rods, interconnecting supports having movable rod-shaped contacts secured to the mid-portion thereof, a contact extension disposed at one end of the movable contact assemblage, an actuating member for striking the contact extension and hence moving the movable contact assemblage to the closed-circuit position, the rod-shaped contacts being spaced along the movable contact assemblage, a framework adapted to be secured to the inner wall of the casing and carrying a plurality of spaced intermediate bridging contacts, one end of a plurality of the bridging contacts establishing arcing with a plurality of the rod-shaped movable contacts, and the other ends of the last-mentioned bridging contacts bearing against the sides of adjacent movable rod-shaped contacts, and means biasing the movable contact assemblage to the open-circuit position.

5. The combination in a circuit interrupter of a casing, a movable contact assemblage movable within the casing and adapted to be removed therefrom, means defining at least one laterally biased relatively stationary bridging contact within the casing, and means for receiving a retracting bolt for moving the bridging contact laterally away from the movable contact assemblage to permit ready withdrawal of the movable contact assemblage from the casing.

6. The combination in a circuit interrupter of a casing, a movable contact assemblage movable within the casing including a plurality of rod-shaped movable contacts, an intermediate bridging contact assemblage including a tube, a plurality of intermediate finger contacts nested within the tube, one end of the finger contacts establishing arcing with one movable contact, the other ends of the finger contacts bearing against the side of another rod-shaped movable contact, and the walls of the tube being slotted to accommodate the movable contact assemblage.

7. A circuit interrupter including hollow casing means, means for establishing an arc including a movable rod-shaped contact, means for extinguishing the arc including an arc-extinguishing unit, said unit defining a plurality of vent plate portions spaced by orifice plate portions, each vent plate portion having a venting passage leading to the region exteriorly of the hollow casing means, the orifice plate portions having orifices through which the rod-shaped movable contact passes, and the vent plate portions having one or more inlet passages leading to the interior of the hollow casing means.

8. A circuit interrupter including hollow casing means, means for establishing an arc including a movable rod-shaped contact, means for extinguishing the arc including an arc-extinguishing unit, said unit defining a plurality of inlet plate portions having inlet passages leading to the interior of the hollow casing means, one or more vent plate portions, each vent plate portion having a vent passage leading to the region exterior of the hollow casing means, an orifice plate portion separating adjacent inlet and vent plate portions and having an orifice through which the movable rod-shaped contact passes, and a supporting spacer disposed in one or more of the vent passages.

9. A circuit interrupter of the fluid-blast type including an elongated hollow casing, means for establishing a plurality of serially related breaks within the casing, one or more of the breaks being pressure-generating breaks, a plurality of interrupting breaks, a vented extinguishing unit supported by the walls of the casing disposed at each interrupting break and providing a diametrically opposite exhausting of fluid away from the interrupting break to the region externally of said hollow casing, and the vented extinguishing units extending transversely across the hollow casing.

10. The combination in a liquid-break circuit interrupter of an elongated substantially enclosed hollow casing, a plurality of vented arc-extinguishing units supported in spaced relation axially along the wall of the casing and venting to the free space exteriorly of the hollow casing, a ladder-like relatively movable contact assemblage movable within the casing and carrying a plurality of spaced movable rod-shaped contacts, a plurality of relatively stationary intermediate bridging contacts spaced axially along the casing and electrically interconnecting the movable rod-shaped contacts in the closed-circuit position of the interrupter, and a plurality of the movable rod-shaped contacts separating from the intermediate contacts to establish arcing within the vented arc-extinguishing units.

11. The combination in a liquid-break circuit interrupter of an elongated substantially enclosed casing, a plurality of vented arc-extinguishing units supported in spaced relation axially along the wall of the casing, a ladder-like relatively movable contact assemblage movable within the casing and carrying a plurality of spaced movable rod-shaped contacts, a plurality of relatively stationary intermediate bridging contacts spaced axially along the casing and electrically interconnecting the movable rod-shaped contacts in the closed-circuit position of the interrupter, a removable framework supporting the spaced bridging contacts and detachably secured to the inner wall of the casing, and a plurality of the movable rod-shaped contacts separating from the intermediate contacts to establish arcing within the vented arc-extinguishing units.

12. A circuit interrupter including a casing, a ladder-like relatively movable contact assemblage carrying a plurality of movable rod-shaped contacts in spaced relation within the casing, a pair of cooperating frameworks disposed on opposite sides of the ladder-like movable contact assemblage and carrying a plurality of spaced mating bridging contacts, and at least one of the rod-shaped contacts being engaged by a mating set of bridging contacts.

13. A circuit interrupter including a casing, a ladder-like relatively movable contact assemblage carrying a plurality of movable rod-shaped contacts in spaced relation within the casing, a pair of cooperating frameworks disposed on opposite sides of the ladder-like movable contact assemblage and carrying a plurality of spaced mating bridging contacts, at least one of the rod-shaped contacts being engaged by a mating set of bridging contacts, and the cooperating frameworks being detachably secured to the opposite inner walls of the casing.

14. The combination in a circuit interrupter of an arc-extinguishing assemblage including a casing, a relatively stationary disconnecting contact extending within the casing adjacent one end thereof, relatively stationary contact structure adapted to be inserted into the other end of the casing as a unit and including a second disconnecting contact, the second said disconecting contact being removably connected to the first said disconnecting contact to maintain contact therewith during the entire operation of the circuit interrupter, and a movable contact assemblage separate from the relatively stationary contact structure and movable within the casing, said movable contact assemblage being cooperable with the relatively stationary contact structure to establish arcing within the casing.

15. The combination in a circuit interrupter of an arc-extinguishing assemblage including a casing, a relatively stationary disconnecting contact extending within the casing adjacent one end thereof, relatively stationary bridging contact structure removably mounted in the casing as a unit and including one or more bridging contacts, said bridging contact structure also including a second disconnecting contact disposed adjacent one end thereof and making disengageable electrical contact with the first said disconnecting contact, the first said stationary disconnecting contact and the said second disconnecting contact maintaining contacting engagement during the entire operation of the circuit interrupter, a movable contact assemblage movable toward the other end of the casing during opening, and said movable contact assemblage cooperating with the relatively stationary bridging contact structure to establish arcing within the casing.

16. A circuit interrupter of the liquid-break type including a tank of liquid into which projects a terminal bushing, an arc-extinguishing assemblage secured to the interior end of the terminal bushing at one end thereof, said arc-extinguishing assemblage including a casing, a relatively stationary disconnecting contact extending interiorly of the casing at said end of the arc-extinguishing assemblage, relatively stationary contact structure adapted to be inserted into the other end of the assemblage and including a second disconnecting contact which makes disengageable electrical contact with the first said disconnecting contact, the two disconnecting contacts maintaining contacting engagement during the entire operation of the circuit interrupter, and movable contact structure movable within the casing and cooperable with said relatively stationary contact structure to establish arcing.

17. A circuit interrupter including a casing, means stationarily mounting the casing adjacent one end thereof, a relatively stationary disconnecting contact extending interiorly within the casing at said end of the casing, contact structure adapted to be inserted into the casing at the other end thereof and including a second disconnecting contact, the second said disconnecting contact making disengageable electrical connection with the first said disconnecting contact, the two disconnecting contacts maintaining contacting engagement during the entire operation of the circuit iterrupter, and means cooperable with said contact structure to establish arcing.

18. A circuit interrupter including a casing, means stationarily mounting the casing adjacent one end thereof, a relatively stationary disconnecting contact extending interiorly within the casing at said end of the casing, contact structure removably mounted in the casing through the other end thereof and including a second disconnecting contact, the second said disconnecting contact making disengageable electrical connection with the first said disconnecting contact, the two disconnecting contacts maintaining contacting engagement during the entire operation of the circuit interrupter, and a movable contact assemblage movable toward said other end of the casing during opening and cooperating with said contact structure to establish arcing within the casing.

19. A circuit interrupter including a tank, a pair of terminal bushings extending interiorly within the tank and supporting a serially related pair of interrupting assemblies, a conducting cross-bar for electrically interconnecting the interrupting assemblies in the closed-circuit position, each interrupting assembly including an elongated hollow casing, a ladder-like relatively movable contact assemblage movable within each casing and having a contact extension associated therewith, and the conducting cross-bar striking the contact extensions during the closing operation to effect corresponding closing movement of the two ladder-like relatively movable contact assemblages.

20. A circuit interrupter including a tank, a pair of terminal bushings extending interiorly within the tank and supporting a serially related pair of interrupting assemblies, a conducting cross-bar for electrically interconnecting the interrupting assemblies in the closed-circuit position, each interrupting assembly including an elongated hollow casing, a ladder-like relatively movable contact assemblage movable within each casing and including a pair of spaced insulating operating rods, and one or more arc-extinguishing units extending transversely across each casing between the operating rods.

21. A circuit interrupter including a tank, a pair of terminal bushings extending interiorly within the tank and supporting a serially related pair of interrupting assemblies, a conducting cross-bar for electrically interconnecting the interrupting assemblies in the closed-circuit position, each interrupting assembly including an elongated hollow casing, a ladder-like relatively movable contact assemblage movable within each casing and including a pair of spaced insulating operating rods, one or more arc-extinguishing units extending transversely across each casing between the operating rods, and the arc-extinguishing units being supported by the side walls of the casing.

22. A circuit interrupter including a tank, a pair of terminal bushings extending interiorly within the tank and supporting a serially related pair of interrupting assemblies, a conducting cross-bar for electrically interconnecting the interrupting assemblies in the closed-circuit position, each interrupting assembly including an elongated hollow casing, a movable contact assemblage movable within each casing and including a plurality of axially spaced movable contacts, means supporting a plurality of relatively stationary bridging contacts within each casing, at least one movable contact in each casing establishing arcing with one end of a bridging contact disposed therein, the other end of said bridging contact having an electrical connection with an adjacent movable contact, and the conducting cross-bar effecting movement of the two movable contact assemblages.

23. A circuit interrupter including a tang, a pair of terminal bushings extending interiorly within the tank and supporting a serially related pair of interrupting assemblies, a conducting cross-bar for electrically interconnecting the interrupting assemblies in the closed-circuit position, each interrupting assembly including an elongated hollow casing, a movable contact assemblage movable within each casing and including a plurality of axially spaced movable contacts, means supporting a plurality of relatively stationary bridging contacts within each casing, at least one movable contact in each casing establishing arcing with one end of a bridging contact disposed therein, the other end of said bridging contact having an electrical connection with an adjacent movable contact, the conducting cross-bar effecting movement of the two movable contact assemblages, and one or more arc-extinguishing units supported by the side walls of each casing and extending transversely across the interior of the casing.

24. A circuit interrupter including a hollow casing, means including a movable rod-shaped contact for establishing an arc within the hollow casing, an arc-extinguishing unit for effecting the extinction of the arc including a plurality of transversely extending vent portions spaced by orifice portions, the orifice portions each having an orifice opening through which the rod-shaped movable contact passes with slight clearance, the vent portions having venting passages associated therewith extending alternately in opposite directions to the region externally of the casing, the vent portions having inlet portions associated therewith, and the inlet portions communicating with the region internally of the hollow casing.

References Cited in the file of this patent

UNITED STATES PATENTS

| | | |
|---|---|---|
| 1,860,337 | Prince et al. | May 24, 1932 |
| 2,228,231 | Hilliard | Jan. 7, 1941 |
| 2,406,469 | Ludwig et al. | Aug. 27, 1946 |
| 2,460,450 | Cumming | Feb. 1, 1949 |
| 2,545,334 | Balentine | Mar. 13, 1951 |
| 2,675,446 | Umphrey | Apr. 13, 1954 |
| 2,677,740 | Allard | May 4, 1954 |